(12) United States Patent
Berens et al.

(10) Patent No.: US 8,341,507 B2
(45) Date of Patent: Dec. 25, 2012

(54) METHOD AND DEVICE FOR DECODING A RECEIVED SYSTEMATIC CODE ENCODED BLOCK

(75) Inventors: Friedbert Berens, Geneva (CH); Cem Derdiyok, Niederbuchsiten (CH); Franck Kienle, Kirrweiler (DE); Timo Lehnigk-Emden, Kaiserslautern (DE); Norbert Wehn, Queidersbach (DE)

(73) Assignee: STMicroelectronics N.V., Amsterdam (NL)

( * ) Notice: Subject to any disclaimer, the term of this patent is extended or adjusted under 35 U.S.C. 154(b) by 879 days.

(21) Appl. No.: 12/323,750

(22) Filed: Nov. 26, 2008

(65) Prior Publication Data

US 2009/0138780 A1 May 28, 2009

(30) Foreign Application Priority Data

Nov. 28, 2007 (EP) .................................... 07121799

(51) Int. Cl.
*H03M 13/00* (2006.01)
(52) U.S. Cl. .................. 714/780; 714/755; 714/758
(58) Field of Classification Search .................. 714/780, 714/755, 758
See application file for complete search history.

(56) References Cited

U.S. PATENT DOCUMENTS

| | | | | |
|---|---|---|---|---|
| 4,494,234 A * | 1/1985 | Patel | ............................ | 714/765 |
| 6,675,348 B1 * | 1/2004 | Hammons et al. | ............ | 714/790 |
| 6,859,906 B2 * | 2/2005 | Hammons et al. | ............ | 714/786 |
| 6,904,555 B2 * | 6/2005 | Nagase et al. | ................ | 714/751 |
| 7,000,174 B2 * | 2/2006 | Mantha et al. | ................ | 714/790 |
| 7,093,180 B2 * | 8/2006 | Shin et al. | ..................... | 714/755 |
| 7,168,030 B2 * | 1/2007 | Ariyoshi | ....................... | 714/786 |
| 7,234,095 B2 * | 6/2007 | Lee et al. | ...................... | 714/751 |
| 7,395,492 B2 * | 7/2008 | Dominique et al. | .......... | 714/794 |
| 7,421,644 B2 * | 9/2008 | Mantha et al. | ................ | 714/800 |
| 7,565,594 B2 * | 7/2009 | Dominique et al. | .......... | 714/755 |
| 7,602,838 B2 * | 10/2009 | Bottomley et al. | ........... | 375/148 |
| 7,793,189 B2 * | 9/2010 | Yano et al. | .................... | 714/748 |
| 7,895,506 B2 * | 2/2011 | Bhora et al. | .................. | 714/794 |
| 2005/0138520 A1 | 6/2005 | Richardson | .................... | 714/755 |

FOREIGN PATENT DOCUMENTS

| | | |
|---|---|---|
| JP | 2004/048400 | 2/2004 |
| WO | 02/07374 | 1/2002 |

OTHER PUBLICATIONS

Stephen B. Wicker, Error Control for Digital Communication and Storage, Prentice-Hall 1995; pp. 98-121.*
Ngatched T M N et al., "Two Decoding Algorithms for Low-Density Parity-Check Codes", Communications, 2005; ICC 2005. 2005 IEEE International Conference on Seoul, Korea May 16-20, 2005, Piscataway, NJ, USA, IEEE, May 16, 2005, pp. 673-677, XP010825377.
Kienle et al., "Low Complexity Stopping Criterion for LDPC Code Decoders", Vehicular Technology Conference, 2005, VTC 2005-Spring, 2005 IEEE 61$^{st}$, May 30-Jun. 1, 2005, pp. 606-609, vol. 1.
Gilbert et al., "Low Complexity Stopping Criterion for UMTS Turbo-Decoders", Vehicular Technology Conference, 2003, VTC 2003-Spring, IEEE Semiannual, Apr. 22-25, 2003, pp. 2376-2380, vol. 4.
Gallager, "Low-Density Parity-Check Codes", IRE Transactions on Information Theory, 1962, pp. 21-28.

\* cited by examiner

*Primary Examiner* — Joseph D Torres
(74) *Attorney, Agent, or Firm* — Allen, Dyer, Doppelt, Milbrath & Gilchrist, P.A.

(57) ABSTRACT

A method of decoding a received systematic code encoded block corresponding to an original block of information, wherein the received systematic code encoded block may include soft systematic values, may include detecting an error condition in the received systematic code encoded block. The method may also include decoding the received systematic code encoded block for retrieving the original block of information if the error condition in the received systematic code encoded block is detected and processing the soft systematic values to retrieve the original block of information instead of the decoding if the error condition in the received systematic code encoded block is not detected.

18 Claims, 4 Drawing Sheets

METHOD AND DEVICE FOR DECODING A RECEIVED SYSTEMATIC CODE ENCODED BLOCK

FIELD OF THE INVENTION

The invention relates to the decoding of code and coded blocks, in particular systematic code encoded blocks, for example LDPC ("Low Density Parity Check") code encoded blocks. A non-limitative application of the invention is directed to wireless communication systems.

BACKGROUND OF THE INVENTION

The channel coding part is a very important component in wireless communication systems like UMTS, WLAN (Wireless Local Access Network) and WPAN (Wireless Personal Access Network). Especially in the domain of WLAN and WPAN, the latency of the decoding is of a critical importance. Low Density Parity Check codes can be seen as a promising candidate for this kind of system in the near future. These codes are being deployed in the future version of the DVB-S (Digital Video Broadcasting) standard, WiMax 16e, WiFi 802.11n and in some fiber optical communication systems. More applications may follow in the near future.

The LDPC codes have some very interesting properties, which make them a natural choice for latency critical application. The decoding of LDPC codes is an iterative process, e.g. for the DVB-S2 standard up to 40 iterations are desired to gain the desired communication performance. The number of iterations is one of the main parameters governing the power consumption of an LDPC decoder, which is a very big challenge to solve. For that reason, several approaches have been disclosed for reducing as far as possible the number of iterations, as indicated therebelow.

Standard LDPC code decoder implementations assume a fixed number of iterations. For decodable blocks, the inherent stopping criterion of the check node sum is an ideal stopping criterion. But for undecodable blocks, where the full number of iterations is processed, a lot of energy and processing time is wasted. The design metrics, latency, and energy consumption increase linearly with the number of decoding iterations. Therefore, it is highly desirable to stop the decoding for undecodable blocks at an early stage of the decoding process.

Other conventional methods, such as, for example, the one disclosed in the article of Frank Kienle and Norbert Wehn "Low Complexity Stopping Criterion for LDPC Code Decoders", Proc. 2005-Spring Vehicular Technology Conference (VTC '05 Spring), Stockhlom, Schweden 2005, combine the above mentioned inherent criterion with an additional stopping criterion. The iteration control determines whether a data block is already successfully decoded or not decodable at all. It is computed based on information available during decoding. At the end of each iteration, the decoder performs a check on the condition for stopping.

Other iteration control mechanisms have been disclosed in literature for other existing iterative coding schemes, like turbo-codes (F. Gilbert, F. Kienle, and N. Wehn, "Low Complexity Stopping Criteria for UMTS Turbo-Decoders," Proc. 2003-Spring Vehicular Technology Conference (VTC Spring '03), Jeju, Korea 2003).

SUMMARY OF THE INVENTION

According to an embodiment, a method and a device may allow the reduction of the number of used decoding iterations, especially in the region of higher Signal to Noise Ratio (SNR), permitting, thus, the power consumption and the average latency to be reduced.

According to an embodiment, a decision may be made if a received encoded block is correct or not before entering the actual decoding process, thus, leading eventually to an operation where no iteration is needed at all in the decoder, whereas at least one iteration in the decoder is needed in the state of the art decoding methods.

For example, by implementing an initial decision mechanism on whether or not the received block is in error, the decoder only needs to operate when the received block is in error. Such a method and device can be used in all kinds of systematic codes, like, for example, turbo codes or LDPC codes.

According to an aspect, a method of decoding a received systematic code encoded block corresponding to an original block of information, the received encoded block including soft systematic values may include detecting whether or not the received encoded block is considered in error. The method may further include performing a decoding of the received encoded block for retrieving the original block of information if the received encoded block is considered in error, and processing only the soft systematic values for retrieving the original block of information if the received encoded block is not considered in error.

Such an embodiment is different from conventional methods of iteration controlling, which have to use one initial iteration of the decoder itself before the result is checked. Several possibilities exist for detecting whether or not the received encoded block is considered in error.

For example, the value of the SNR may be a decision criterion. More precisely, it can be decided that if the SNR is greater than a given threshold, the received encoded blocks are considered to be not in error. This is, for example, the case when the device is operating in good channel conditions, e.g. 10 dB or 15 dB above a given SNR value. At this operational point, the power consumption savings can be in the range of 50% to 80% compared to the power consumption of a single decoding iteration. However, other approaches are possible for performing such a detection, such as a parity check.

According to an embodiment, when the received encoded block is not considered in error, and when the information of the original block includes bits, processing only the soft systematic values comprises performing a hard decision processing of the soft values for obtaining hard decided systematic bits corresponding to the bits of the original block.

According to an embodiment wherein the received encoded block further includes soft parity values, the detecting step comprises performing a hard decision processing of the soft values of the block for obtaining hard decided bits and performing a parity check of the hard decided bits of the block for deciding whether or not the received block is considered in error. For example, the received block is considered in error if the number of errors resulting from the parity check is greater than a threshold.

According to an embodiment, the systematic code has a minimum hamming distance and the threshold is equal to half of the minimum hamming distance.

Several possibilities exist for performing a parity check. For example, for an LDPC code which is a linear block code defined by its sparse parity check matrix H, performing a parity check may comprise performing a hard decision processing on the soft values of the received encoded block for obtaining a codeword including bits and multiplying the transposed obtained codeword by the parity check matrix. If the result of this multiplication is zero, thus, the received encoded block is considered to be not in error whereas it is considered to be in error if the result of this multiplication is not equal to zero.

However, a less complex implementation may comprise using a systematic code encoder in particular the encoder of the transmission chain of a wireless apparatus, for performing this parity check operation. More precisely, according to an embodiment, performing a hard decision processing of the soft values comprises obtaining hard decided systematic bits from the soft systematic values and first hard decided parity bits from the soft parity values and performing the parity check comprises encoding the hard decided systematic bits with the systematic code for generating an encoded codeword including generated parity bits, and performing an error detection between the first hard decided parity bits and the generated parity bits.

According to an embodiment, performing the error detection comprises counting the number of the generated parity bits differing from the first hard decided parity bits.

According to another aspect, a device may include an input to receive a systematic code encoded block corresponding to an original block of information. The encoded block may include soft systematic values. The device may also include a detector to detect whether or not the received encoded block is considered in error and a decoder to perform a decoding of the received encoded block for retrieving the original block of information. The device may further include a first processor to process only the soft systematic values for retrieving the original block of information, and a controller to deliver the received encoded block to the decoder if the received encoded block is considered in error and to the first processor if the received encoded block is not considered in error.

According to an embodiment, the information of the original block are bits, and the first processor comprises a hard decision processor to perform a hard decision processing of the soft values for obtaining hard decided systematic bits corresponding to the bits of the original block.

According to an embodiment, the received encoded block further includes soft parity values and the detector comprises a second processor to perform a hard decision processor of the soft values of the received encoded block for obtaining hard decided bits, a third processor to perform a parity check of the hard decided bits for deciding whether or not the received block is considered in error.

According to an embodiment, the second processor is configured to deliver hard decided systematic bits from the soft systematic values and first hard decided parity bits from the soft parity values and the third processor comprises an encoding to encode the hard decided systematic bits with the systematic code for generating an encoded codeword including generated parity bits, and an error detector to perform an error detection between the first hard decided parity bits and the generated parity bits.

According to an embodiment, the error detector comprises a counter to count the number of the generated parity bits differing from the first hard decided parity bits.

According to another aspect, a wireless apparatus comprises a receiving chain including a device as defined above.

According to an embodiment, the wireless apparatus further comprises a transmission chain including a systematic code encoder, the transmission chain and receiving chain being adapted to operate in a time division mode and the receiving chain includes a device as defined above, the encoder of the device comprising the systematic code encoder of the transmission chain.

Other advantages and features appear on examining the detailed description of embodiments, these being in no way limiting.

DETAILED DESCRIPTION OF THE PREFERRED EMBODIMENTS

An example of the present invention will now be described in detail, referring to FIGS. 1 to 5, in which the systematic code is an LDPC code. However, the invention is not limited to this particular application and can be applied to any systematic code, for example Reed-Solomon codes or turbo codes.

A systematic code is a code which is well known by the man skilled in the art. It is nevertheless reminded that in a coding domain, a systematic code is one in which input data is embedded in the encoded output. The input data or systematic information, can be thus easily retrieved among the encoded codeword. Such codes are used to add redundant information, for example parity information, to data which are the systematic values. This allows errors to be detected and possibly corrected depending on the code used, when bits are lost or corrupted.

Low-Density Parity-Check codes were introduced by Gallager in 1962 (Low-density Parity check codes. M.I.T. Press, Cambridge, Mass., USA, 1962) and re-discovered in 1996 by MacKay and Neal. For a long time they had practical impact due to their computational and implementation complexity. This changed with advances in microelectronics that led to more computational power at hand for simulation and which now enables implementation. Due to their excellent error correction performance, they are considered for future telecommunication standards.

An LDPC code is a linear block code defined by its sparse M×N parity check matrix H. It contains j ones per column and k ones per row, called row and column degree respectively. A (j,k)-regular LDPC code has row and column degree of uniform weight, otherwise the code is called irregular. A parity check code can be represented by a bipartite graph. The M check nodes correspond to the parity constraints, the N variable nodes represent the data symbols of the codeword. An edge in the graph corresponds to a one in the parity check matrix.

In other words, a codeword (encoded block) of N data symbols (bits, for example) comprises N−M systematic data symbols (i.e. the actual data symbols of the original block before encoding) and M redundant symbols (bits, for example) also called parity symbols (or parity bits).

LDPC codes can be decoded using message passing algorithms, either in hard or soft decision form. The decoding is then an iterative process, which exchanges messages between variable and check nodes. Typically a Belief Propagation (BP) algorithm is used, which exchanges soft-information iteratively between variable and check nodes. The code performance mainly depends on the randomness H, the codeword size N and the code rate $R=(N-M)/N$.

Figure 1:
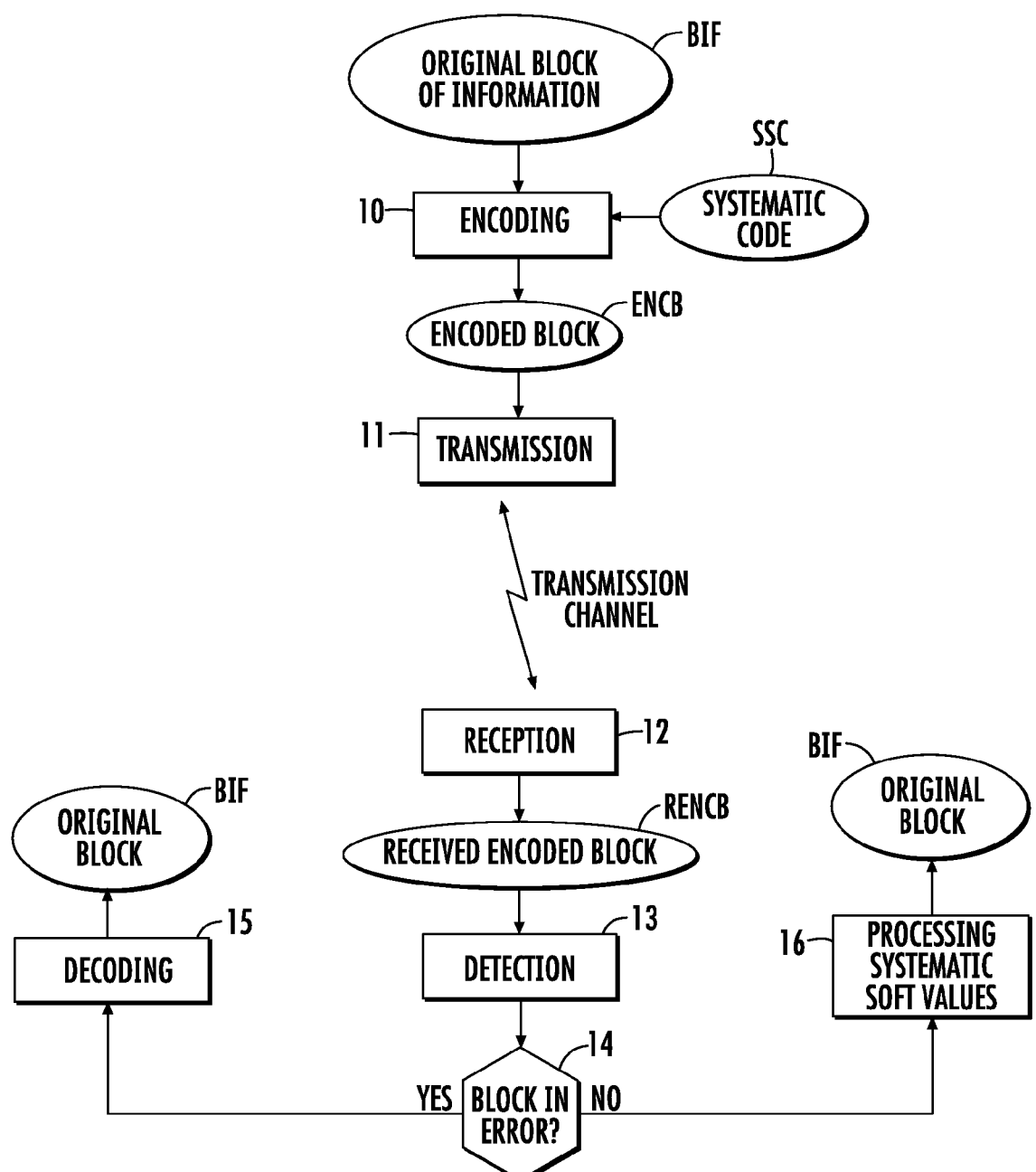
FIGS. 1 and 2 are diagrammatic flow charts related to embodiments of the present invention.
Figure 2:
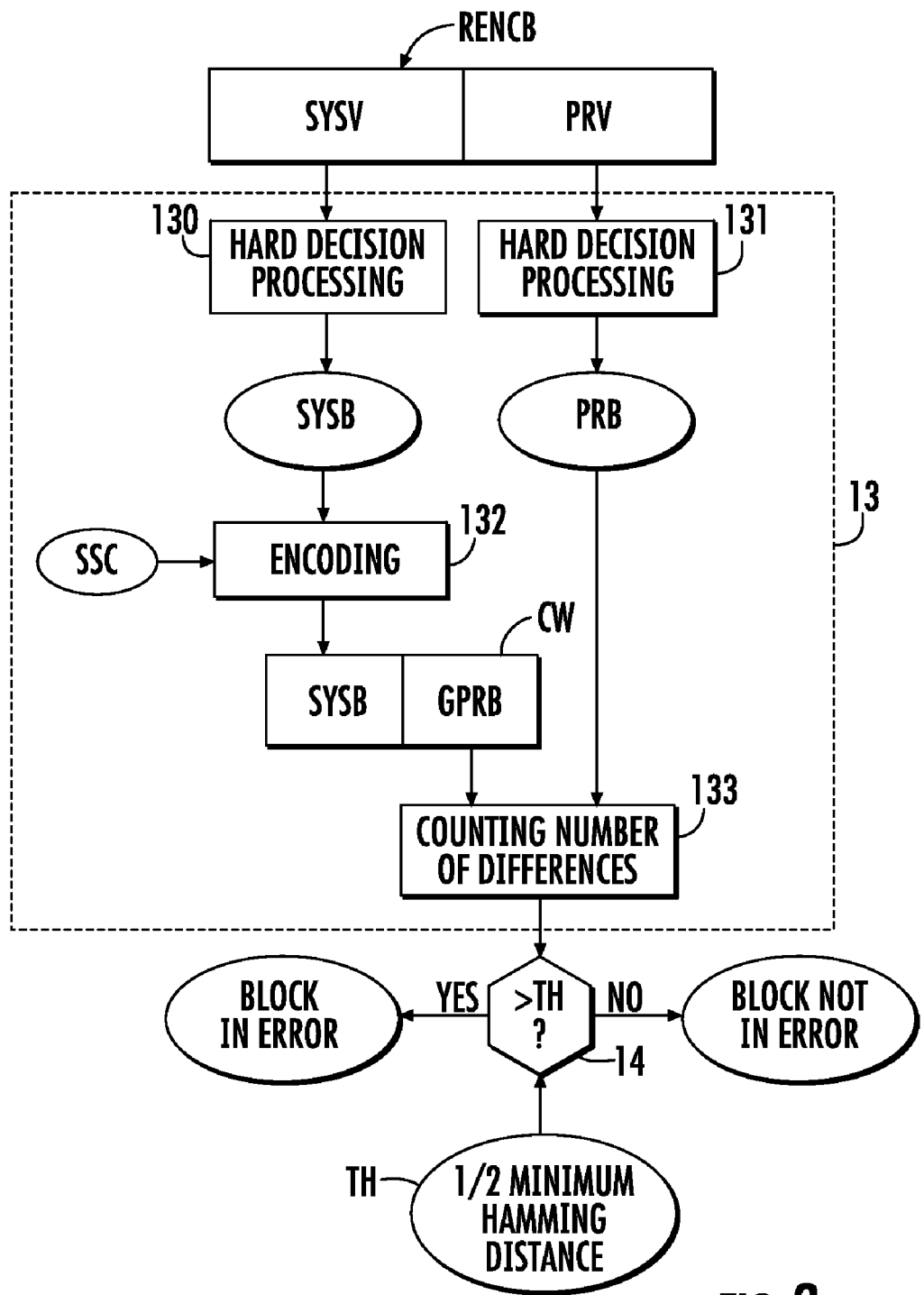

Turning now more particularly to FIG. 1, an original block of information BIF, for example, an original block of bits, is encoded (step 10) by using a systematic code SSC, for example, in the present case an LDPS code.

An encoded block ENCB is thus obtained and thereafter transmitted (step 11) on a transmission channel, for example, the air. The encoded block ENCB comprises systematic bits corresponding to the bits of the original block BIF, followed by parity bits. The transmitted encoded block is received (step 12) on the receiving side and detection processing 13 is performed on the received encoded block RENCB. The aim of this detection processing 13 is to determine whether or not the received encoded block RENCB is in error (step 14).

If the block RENCB is considered to be in error, an actual conventional decoding process 15 is performed on this encoded block RENCB in order to retrieve the original block BIF. On the contrary, if the received encoded block RENCB is not considered to be in error, thus, processing 16 is performed on the systematic soft values of the encoded block RENCB in order to retrieve the original block BIF.

As it is well known by the man skilled in the art, the received encoded block RENCB comprises so-called "soft" values which are for example, Log-Likelihood-Ratio (LLR):

$$LLR(d_k) = \text{Log}(P(d_k=1)/P(d_k=0))$$

Such a soft value is in fact a bit estimation. The sign of the soft value shows whether this bit $d_k$ is supposed to be 1 or zero, whereas the confidence in decision is represented by the magnitude of the soft value. The received encoded block RENCB comprises soft systematic values SYSV and soft parity value PRV.

If the block RENCB is not considered to be in error, performing a hard decision processing on the soft systematic values SYSV permits direct obtaining of the bits of the original block BIF. A hard decision processing of a soft value is a processing, which is well known by the man skilled in the art. More precisely, such a hard decision processing comprises extracting the sign of a soft value and obtaining the corresponding bit, called "hard decided bit", the value thereof depending on the sign of the soft value.

As explained above, many possibilities exist for performing the detection processing 13. One of these approaches comprises a parity check of the hard decided bits of the received encoded blocks RENCB. Again, several possibilities exist for performing such a parity check. One of these possibilities is disclosed more in detail in FIG. 2.

Firstly, hard decision processing 130 and 131 are respectively performed on the soft systematic values SYSV and the soft parity values PRV of the encoded block RENCB. Hard decided systematic bits SYSB and first hard decided parity bits PRB are thus respectively obtained. The hard decided systematic bits SYSB are then encoded (step 132) by using the systematic code SSC for generating an encoded codeword including the hard decided systematic bits SYSB as well as generated parity bits GPRB. Then, an error detection 133 is performed between the first hard decided parity bits PRB and the generated parity bits GPRB.

In the present example, performing the error detection 133 comprises counting the number of the generated parity bits GPRB differing from the first hard decided parity bits PRB. If this number difference is smaller than a given threshold TH, the block is not considered to be in error. If the number difference is greater than the threshold TH, thus the block is considered to be in error.

Although the threshold may be equal to zero, it is also possible to set the threshold to the half minimum Hamming distance of the code. A Hamming distance of a code is a feature well known by the man skilled in the art. It is reminded here that the Hamming distance between two codewords of the code of equal length is a number of positions for which the corresponding symbols are different. Put another way, the Hamming distance measures the minimum number of substitutions to change one into the other, or the number of errors that transforms one codeword into the other.

Figure 3:
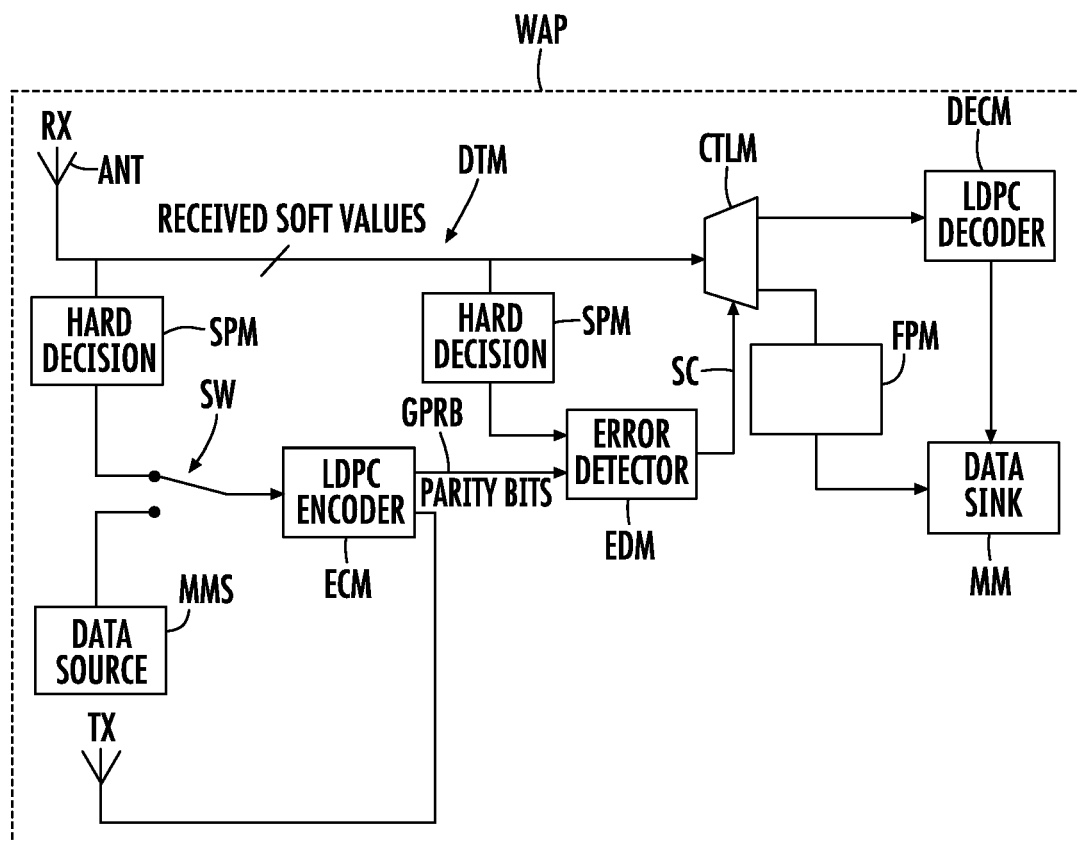
FIG. 3 diagrammatically illustrates an embodiment of a wireless apparatus including an embodiment of a device according to the invention.

Turning now to FIG. 3, an example of the wireless apparatus WAP is disclosed. The wireless apparatus WAP comprises a receiving chain RX diagrammatically and partially illustrated in FIG. 3 for receiving the successive encoded blocks RENCB.

In the present example, this wireless apparatus WAP also comprises a transmission chain TX, also diagrammatically and partially illustrated in FIG. 3. The transmission chain comprises conventionally a first memory MMS or data source, containing the data to be transmitted after encoding onto the air channel. The transmission chain further comprises an encoder ECM, here an LDPC encoder which perform an LDPC encoding of the data contained in the data source MMS.

The device included in the wireless apparatus WAP comprises an input (here an antenna) ANT adapted to receive the successive systematic code encoded blocks corresponding to successive original blocks of information. The device further comprises a detector DTM adapted to detect whether or not a received encoded block is considered in error.

The device further comprises a decoder DECM, here a conventional LDPC decoder, adapted to perform a decoding of the received encoded block for retrieving the original block of information, and first processor FPM adapted to process only the soft systematic values of the received encoded block for retrieving the original block of information.

Further, the controller CTLM comprises a controllable multiplexer, and delivers the received encoded block to the decoder DECM or to the first processor FPM depending on whether or not the received encoded block is considered in error. All the elements of this device may be implemented by software or by logic circuits.

The first processor FTM comprises a hard decision processor adapted to perform a hard decision processing on the soft values of the received encoded block for obtaining hard decide systematic bits corresponding to the bits of the original block. The hard decided systematic bits are thus stored in a memory MM and/or delivered to higher layers of the apparatus wireless WAP, such as MAC layer without any decoding operation in the decoder DECM. The detector DTM comprises a second processor SPM, which is a hard decision processor.

As illustrated in FIG. 3, the transmission chain TX and the receiving chain RX of the wireless apparatus may operate in a time division mode. More precisely, as the LDPC encoder ECM can be used either by the detector of the receiving chain or by the transmission chain, a controllable switch SW is connected between the input of the LDPC encoder ECM and the output of the hard decision processor SPM and the output of the data source MMS.

In a receive mode, the second processor SPM connected between the antenna ANT and the switch SW perform a hard decision processing of the soft systematic values of the received encoded block in order to deliver to the LDPC encoder ECM hard decided systematic bits. Those hard decided systematic bits are encoded by the LDPC encoder ECM in order to obtain a codeword including generated parity bits, which are delivered to one input of the error detector EDM. On another hand, the second processor SPM connected between the antenna ANT and the other input of the error detector EDM perform a hard decision processing on the received soft parity values of the encoded block RENCB, to deliver first hard decided parity bits to the error detector EDM.

In a particular embodiment, the error detector EDM may comprise a counter to count the number of the generated priority bits differing from the first hard decided parity bits.

Depending on the comparison between this number of differences and the threshold TH, a control signal SC controls the multiplexer CTLM to deliver the encoded received block either to the LDPC decoder DECM or to the first processor FPM.

By sharing the encoder ECM of the transmission chain with the receiving chain of the device, no additional hardware is needed for re-encoding the hard decided systematic bits. Thus, the complexity of the implementation is not increased as compared to a conventional implementation without the detection processing. As a matter of fact, the encoder ECM has, in general, a significantly lower complexity as the encoder deals with a single bit for each information only. By contrast, the decoder DECM has to handle several bits for each information.

Figure 4:
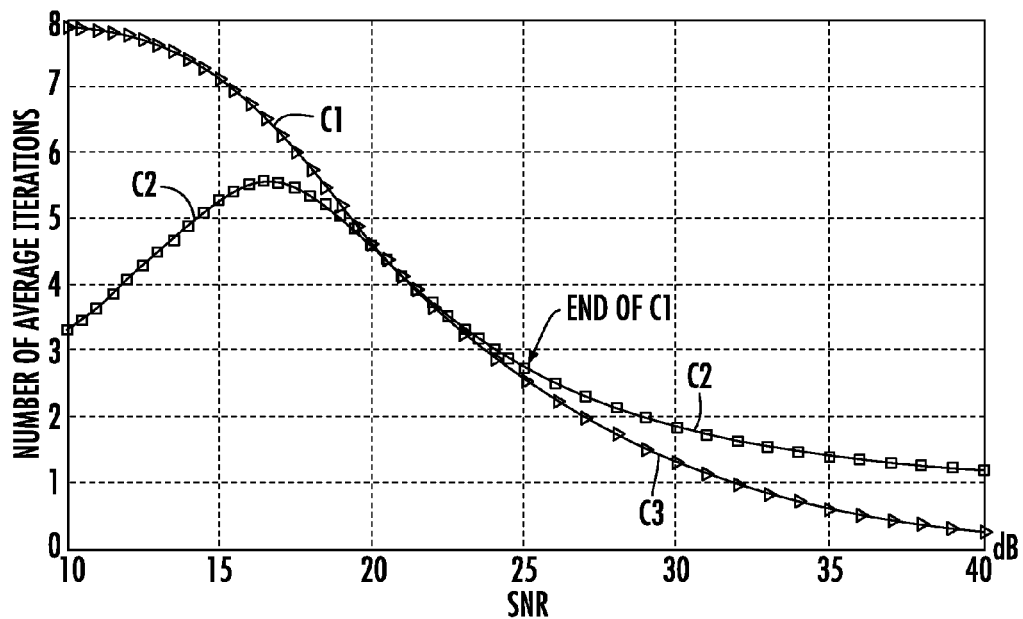
FIGS. 4 and 5 illustrate curves related to results and advantages of an embodiment of the present invention.

In FIG. 4, a comparison between three iteration control methods is presented. Curve C1 shows the mean number of iterations to decode a block over the SNR by using a conventional inherent stopping criterion. Curve C2 presents the results for the stopping criterion disclosed in the above mentioned article of Kienle et.al., "Low Complexity Stopping Criterium for LDPC Code Decoders."

Figure 5:
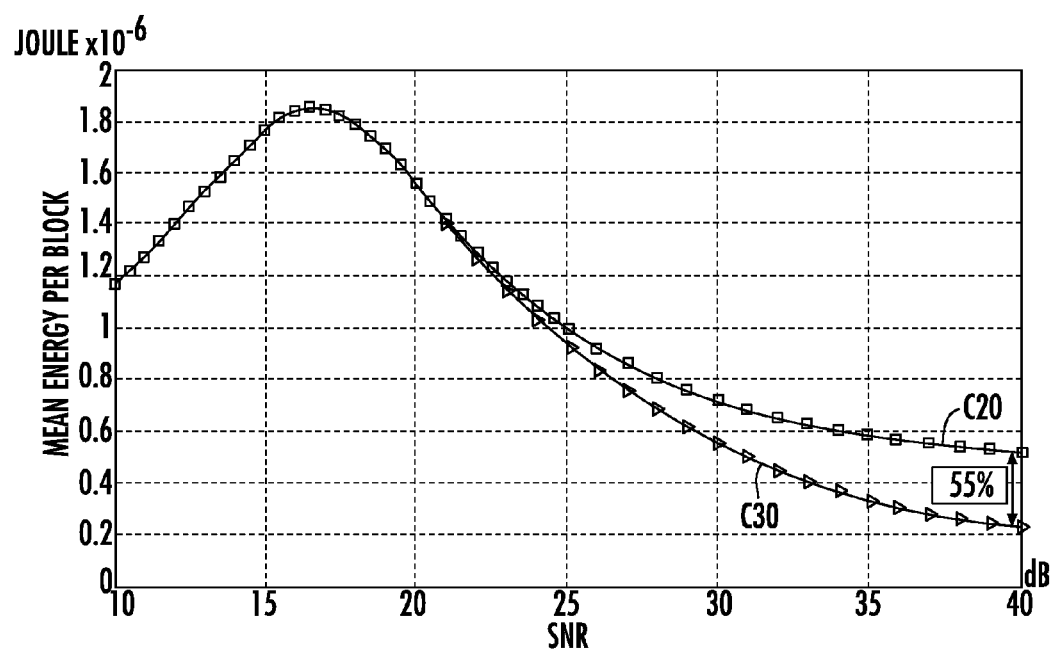

Curve C3 shows the mean number of needed iterations accordingly to an embodiment. It can be seen that the higher the SNR, the higher the saving of iterations compared to the other ones. For 40 dB, nearly 80% of the iterations are saved, and thus, decoding energy. In high SNR regions, the most blocks are error-free or have only a few errors. FIG. 5 shows the mean energy in joules needed to decode one block over the SNR.

Curve C20 is related to the stopping criterion of the above mentioned article of Kienle, whereas C30 corresponds to an example of a method according to an embodiment. In high SNR regions, an embodiment permits to save up to 55% energy. These power results are measured with a device implemented in a FPGA (Field Programmable Gate Array) with a state of the art decoder implementation. Further, for all these curves, the encoded blocks size is 1200 bits and the code rate R is equal to ¾.

That which is claimed:

1. A method of decoding a received systematic code encoded block, received from an antenna coupled to an input of a multiplexer, corresponding to an original block of information encoded by a systematic code, the received systematic code encoded block including soft systematic values, the method comprising:
   detecting, using a detector coupled to the antenna, an error condition in the received systematic code encoded block;
   decoding, using a decoder coupled to a first output of the multiplexer, the received systematic code encoded block for retrieving the original block of information if the error condition in the received systematic code encoded block is detected; and
   processing, using a first processor coupled to a second output of the multiplexer, the soft systematic values to retrieve the original block of information instead of the decoding if the error condition in the received systematic code encoded block is not detected.

2. The method according to claim 1, wherein the original block of information comprises bits; and wherein processing the soft systematic values comprises hard decision processing of the soft systematic values to obtain hard decided systematic bits corresponding to the bits of the original block of information.

3. The method according to claim 1, wherein the received systematic code encoded block further comprises a soft parity value; and wherein detecting an error condition in the received systematic code encoded block comprises hard decision processing of the soft systematic values to obtain hard decided bits, and performing a parity check of the hard decided bits.

4. The method according to claim 3, wherein the error condition in the received systematic code encoded block is detected if a threshold number of parity check errors is exceeded while performing the parity check.

5. The method according to claim 4, wherein the received systematic code encoded block has a hamming distance; and wherein the threshold number is equal to half of the hamming distance.

6. The method according to claim 3, wherein hard decision processing comprises obtaining hard decided systematic bits from the soft systematic values and first hard decided parity bits from the soft parity values; and wherein performing the parity check comprises encoding the hard decided systematic bits with the systematic code to generate an encoded codeword including parity bits, and detecting an error condition between the first hard decided parity bits and the generated parity bits.

7. The method according to claim 6, wherein detecting the error condition between the first hard decided parity bits and the generated parity bits comprises counting a number of the generated parity bits differing from the first hard decided parity bits.

8. The method according to claim 1 wherein the received systematic code encoded block comprises a low-density parity check code encoded block.

9. A device comprising:
   an antenna configured to receive a systematic code encoded block corresponding to an original block of information encoded by a systematic code, the received systematic code encoded block including soft systematic values;
   a multiplexer having an input coupled to said antenna and having first and second outputs;
   a detector coupled to said antenna and configured to detect an error condition in the received systematic code encoded block;
   a decoder coupled to the first output of said multiplexer and configured to decode the received systematic code encoded block to retrieve the original block of information;
   a first processor coupled to the second output of said multiplexer and configured to process only the soft systematic values to retrieve the original block of information; and
   said multiplexer being configured to deliver the received systematic code encoded block to said decoder if the error condition in said received systematic code encoded block is detected and to said first processor instead of said decoder if the error condition in the received systematic code encoded block is not detected.

10. The device according to claim 9, wherein said original block of information comprises bits, and wherein said first processor comprises a hard decision processor configured to perform hard decision processing of the soft values for obtaining hard decided systematic bits corresponding to the bits of the original block of information.

11. The device according to claim 9, wherein the received systematic code encoded block further includes soft parity values; and wherein said detector comprises a second processor configured to perform hard decision processing of the soft values of the received systematic code encoded block to obtain hard decided bits; and further comprising a third processor configured to perform a parity check of the hard decided bits to determine an error condition in the received systematic code encoded block.

12. The device according to claim 11, wherein the received systematic encoded block is considered in error if a number of errors resulting from the parity check is greater than a threshold.

13. The device according to claim 12, wherein the systematic code encoded block has a minimum hamming distance and the threshold is equal to half of the minimum hamming distance.

14. The device according to claim 11, wherein said second processor is configured to deliver hard decided systematic bits from the soft systematic values and first hard decided parity bits from the soft parity values, and said third processor comprises an encoder configured to encode the hard decided systematic bits with the systematic code to generate an encoded codeword including generated parity bits, and an error detector configured to perform an error detection between the first hard decided parity bits and the generated parity bits.

15. The device according to claim 14, wherein said error detector comprises a counter configured to count the number of the generated parity bits differing from said first hard decided parity bits.

16. The device according to claim 9, wherein the systematic code comprises a low density parity check code.

17. A wireless apparatus comprising:
   a receiving chain comprising
      an antenna configured to receive a systematic code encoded block corresponding to an original block of information, the encoded block including soft systematic values,
      a multiplexer having an input coupled to said antenna and having first and second outputs,
      a detector coupled to said antenna to detect whether or not the received encoded block is considered in error,
      a decoder coupled to the first output of said multiplexer and configured to decode the received encoded block for retrieving the original block of information,
      a first processor coupled to the second output of said multiplexer and configured to process only the soft systematic values for retrieving the original block of information, and
      said multiplexer configured to deliver the received systematic code encoded block to said decoder if the error condition in the received systematic code encoded block is detected and to said first processor instead of said decoder if the error condition in the received systematic code encoded block is not detected.

18. The wireless apparatus according to claim 17, further comprising:
   a transmission chain including a systematic code encoder, said transmission chain and said receiving chain operating in a time division mode;
   said detector comprising a second processor to perform hard decision processing of said soft values and configured to deliver hard decided systematic bits from the soft systematic values and first hard decided parity bits from the soft parity values, and a third processor configured to perform a parity check of the hard decided bits to determine an error condition in the received systematic code encoded block and comprising the systematic code encoder configured to encode the hard decided systematic bits with the systematic code to generate an encoded codeword including generated parity bits, and an error detector configured to perform an error detection between the first hard decided parity bits and the generated parity bits.

\* \* \* \* \*